(12) United States Patent
Lu

(10) Patent No.: US 7,071,592 B1
(45) Date of Patent: Jul. 4, 2006

(54) ROTOR FOR MOTOR

(76) Inventor: Yi-Tang Lu, No. 27, Fengshe Rd., Shengkang Hsiang, Taichung County (TW)

( * ) Notice: Subject to any disclaimer, the term of this patent is extended or adjusted under 35 U.S.C. 154(b) by 0 days.

(21) Appl. No.: 11/156,619

(22) Filed: Jun. 21, 2005

(51) Int. Cl.
*H02K 1/18* (2006.01)

(52) U.S. Cl. ............ 310/156.25; 310/156.38; 310/156.46; 310/156.47

(58) Field of Classification Search .......... 310/156.15, 310/156.25, 156.33, 156.36, 156.37, 156.47, 310/156.48, 156.49, 156.51, 156.52, 112, 310/156.38, 156.39, 156.41–156.43, 156.46
See application file for complete search history.

(56) References Cited

U.S. PATENT DOCUMENTS

| 2,887,621 | A | * | 5/1959 | Wilde, Jr. | 361/244 |
| 4,009,406 | A | * | 2/1977 | Inariba | 310/164 |
| 4,642,502 | A | * | 2/1987 | Carpenter et al. | 310/156.12 |
| 4,823,038 | A | * | 4/1989 | Mizutani et al. | 310/257 |
| 5,039,897 | A | * | 8/1991 | Iwamatsu et al. | 310/156.18 |
| 5,410,200 | A | * | 4/1995 | Sakamoto et al. | 310/49 R |
| 6,252,323 | B1 | * | 6/2001 | Nishikawa et al. | 310/156.01 |
| 6,812,614 | B1 | * | 11/2004 | Yamamoto et al. | 310/261 |

* cited by examiner

*Primary Examiner*—Dang Le
(74) *Attorney, Agent, or Firm*—Rosenberg, Klein & Lee

(57) ABSTRACT

A rotor for motor is disclosed to have a plurality of protruding portions arranged in two rows around the periphery of the body thereof and spaced by magnetic gaps, and a plurality of magnets of semicircular cross section respectively covered on the protruding portions and respectively abutted with one end of each of the magnets at one row against two adjacent magnets at the other row.

1 Claim, 5 Drawing Sheets

ROTOR FOR MOTOR

BACKGROUND OF THE INVENTION

1. Field of the Invention

The present invention relates to a motor and more particularly, to a rotor for motor, which produces a great horsepower and reduces the vibration effect.

2. Description of the Related Art

A motor is generally comprised of a rotor, and a stator with a winding. When the winding is electrically connected, a magnetic field is produced to bias the rotor. A conventional rotor 10 for motor, as shown in FIGS. 1, 2A, and 2B, comprises a shaft 11, a body 12 surrounding the shaft 21, and magnetic plates 13. The body 22 has four protruding portions 120 equiangularly spaced around the periphery. A magnetic gap H is defined between each two adjacent protruding portions 120. The magnetic plates 13 are smoothly arched plates respectively fixedly covered on the protruding portions 120. Referring to FIG. 3, the rotor 10 is surrounded by a stator 14. When the winding of the stator 14 is electrically connected, an electromotive force is produced to bias the rotor 10 and the shaft 11. However, this design of rotor is still not satisfactory in function because of low horsepower and high vibration effect. The horsepower is determined subject to the peripheral area of the rotor, i.e., the peripheral area of the magnetic plates 13. However, because the total area of the magnetic plates 13 is approximately equal to the total area of the protruding portions 120, the horsepower of the rotor is limited. Further, because the magnetic gap extends through the two distal ends of the magnetic body, a high vibration effect will be produced during rotation of the rotor.

SUMMARY OF THE INVENTION

The present invention has been accomplished under the circumstances in view. It is therefore one object of the present invention to provide a rotor for motor, which has the advantages of high horsepower (torsional force) and high rotational stability with low vibration effect. To achieve these and other objects of the present invention, the rotor comprises a shaft and a magnetic body surrounding the shaft. The magnetic body comprises a plurality of protruding portions, a plurality of magnetic gaps respectively defined between each two adjacent protruding portions, and a plurality of magnets respectively fixedly covered on the protruding portions. The protruding portions are alternatively arranged in two rows around the periphery of the magnetic body. The protruding portions at one row block one end of each of the magnetic gaps in between each two adjacent protruding portions at the other row. Further, the magnets each have a semicircular cross section. The magnets at the protruding portions at one row each have one end respectively abutted against the magnets at the protruding portions at the other row to form a magnetic line of force blocking structure between the two rows of the magnets at the two rows of the protruding portions.

DESCRIPTION OF THE RELATED ART

DETAILED DESCRIPTION OF THE PREFERRED EMBODIMENT

Figure 1:
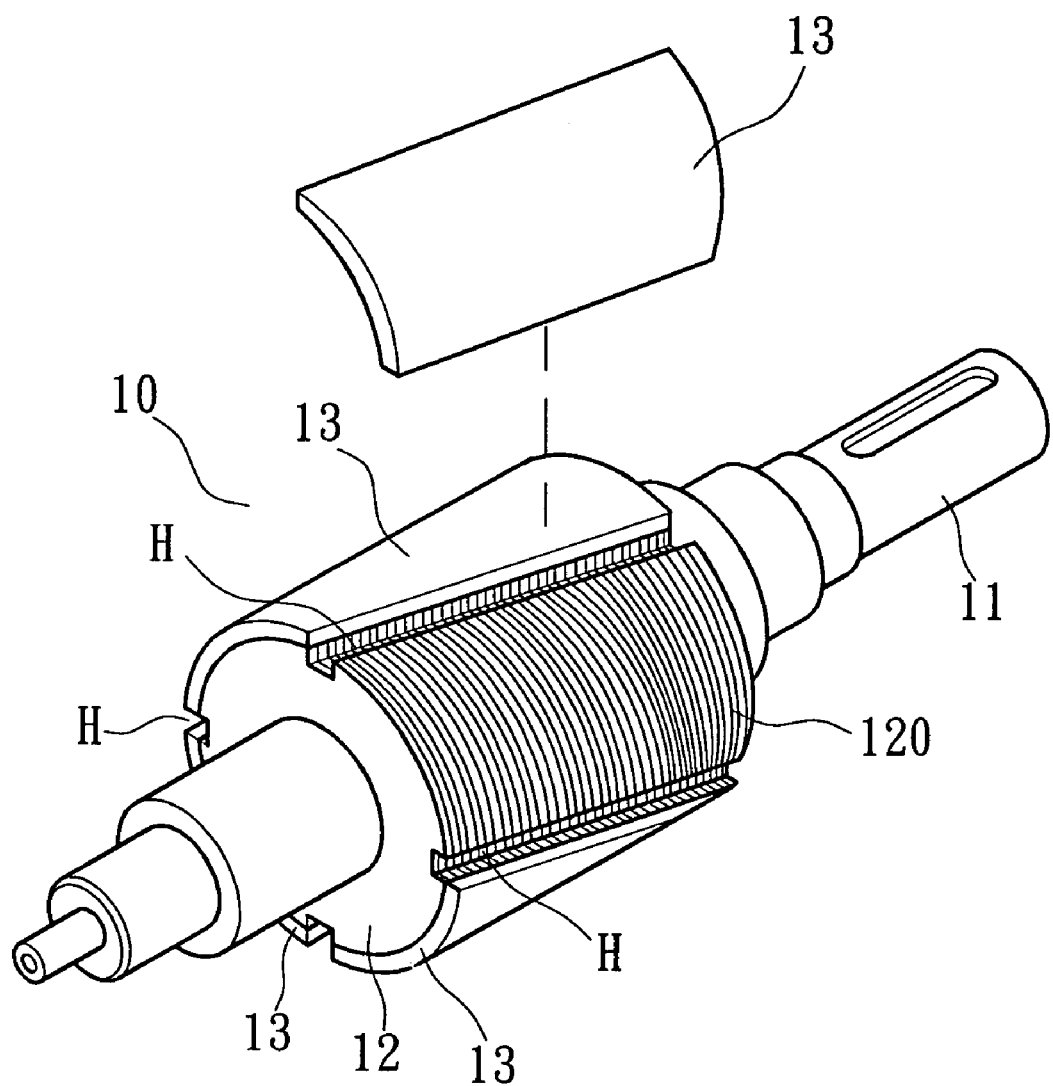
FIG. 1 is an exploded view of a rotor for motor according to the prior art.
Figure 2A:
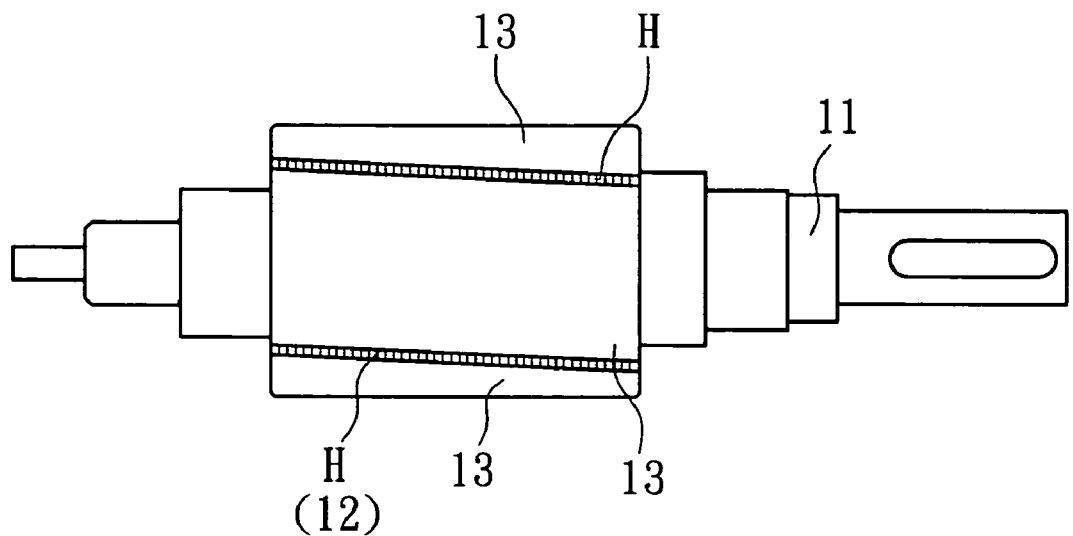
FIG. 2A is a side plain view of the rotor for motor according to the prior art.
Figure 2B:
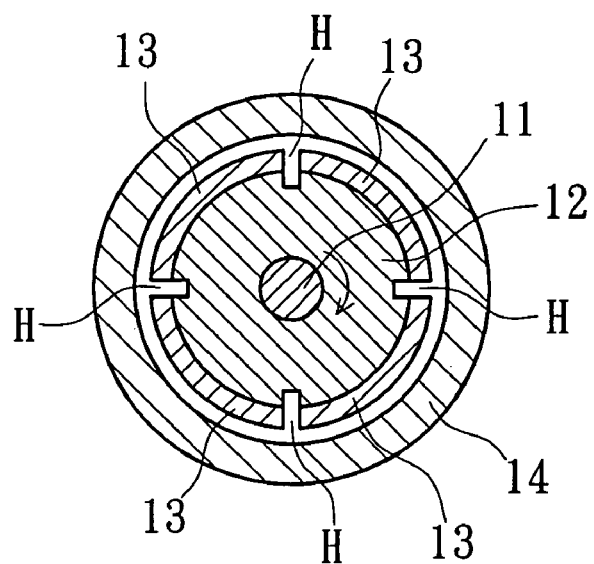
FIG. 2B is a sectional view showing the prior art rotor set in a stator.
Figure 3:
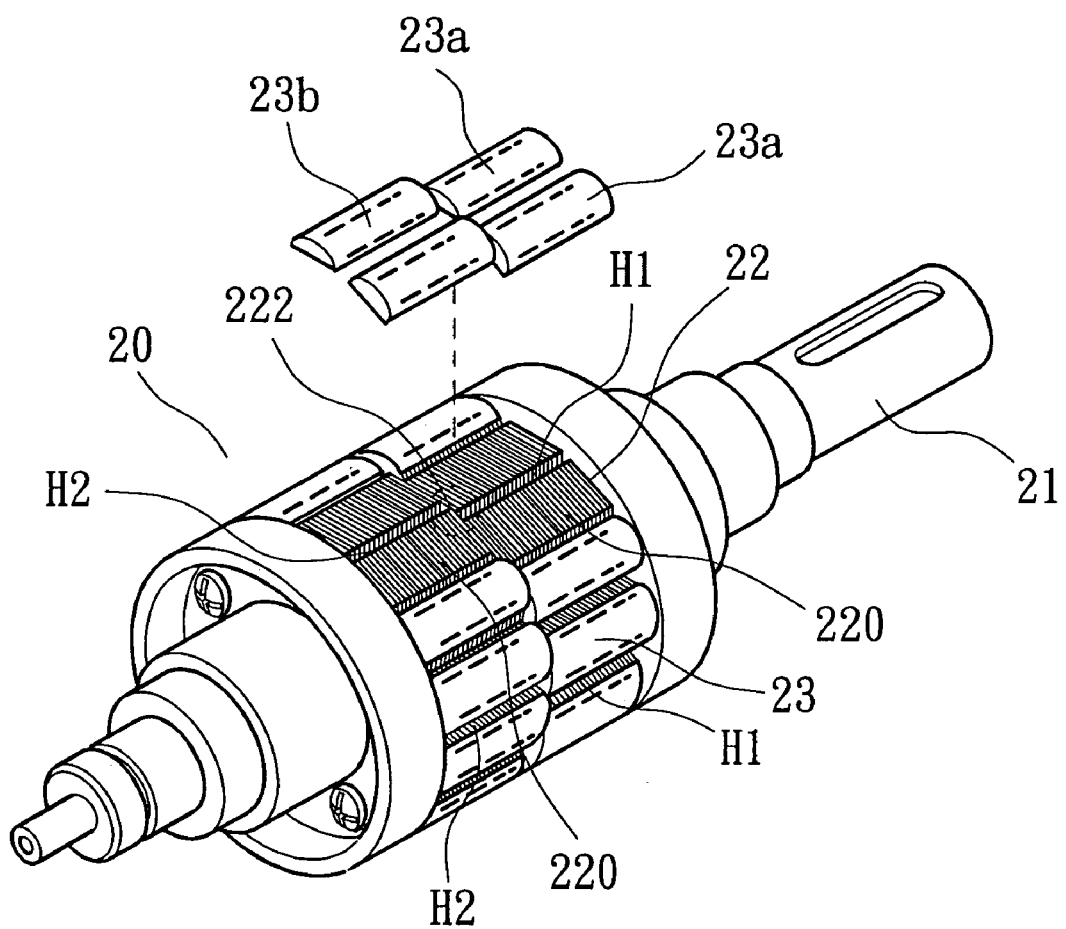
FIG. 3 is an exploded view of a rotor for motor according to the present invention.
Figure 4A:
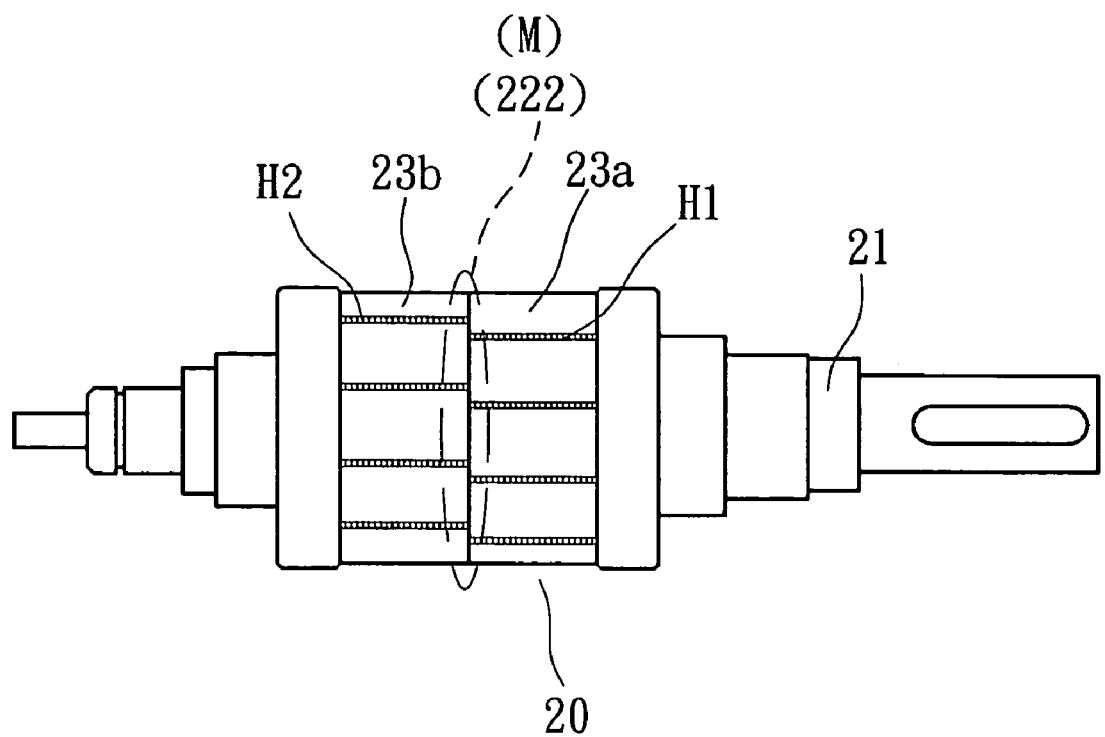
FIG. 4A is a side plain view of the rotor for motor according to the present invention.

Referring to FIGS. 3 and 4A, a rotor 20 in accordance with the present invention is shown comprised of a shaft 21 and a magnetic body 22 surrounding the shaft 21. The magnetic body 22 comprises a plurality of protruding portions 220 spaced around the periphery, a plurality of magnetic gaps H respectively defined in between each two protruding portions 220, and a plurality of magnets 23a and 23b respectively fixedly mounted on the protruding portions 220.

The protruding portions 220 are alternatively arranged in two rows around the periphery of the body, each protruding portion 220 at one row has one end, namely, the connection end 222 abutted against the respective connection ends of two adjacent protruding portions 220 at the other row. The magnetic gaps H1 in between each two adjacent protruding portions at one row and the magnetic gaps H2 in between each two adjacent protruding portions at the other row are isolated from one another. The magnets 23a and 23b are thick magnetic blocks having a semicircular cross section, providing a great magnetic force working area W. After installation of the magnets 23a and 23b in the protruding portions 220, one magnet 23a at one row of the protruding portions 220 has one end stopped at the corresponding ends of two adjacent magnets 23b at the other row of the protruding portions 220 to block one end of the corresponding magnetic gap H2, and therefore a magnetic line of force blocking structure M is formed between the two rows of magnets 23a and 23b.

Figure 4B:
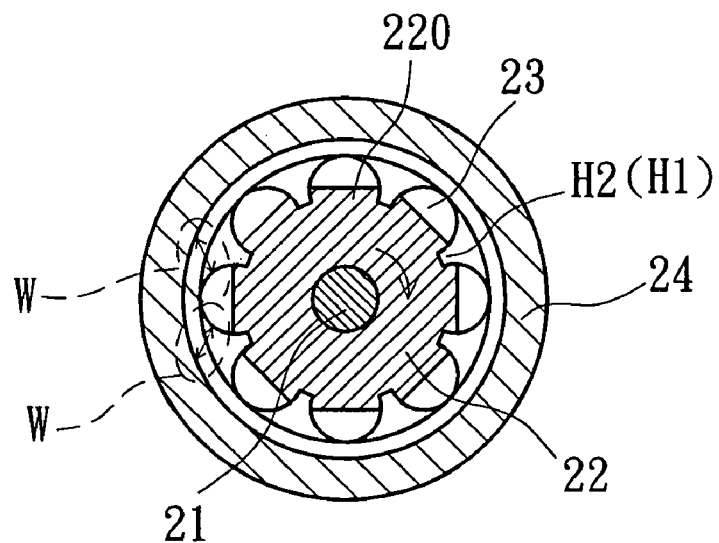
FIG. 4B is a sectional view showing the rotor set in the stator according to the present invention.

By means of the aforesaid arrangement, the rotor 20 has the advantages of high horsepower (torsional force) and high rotational stability with low vibration effect. Because multiple protruding portions 220 are alternatively arranged in two row around the periphery of the magnetic body 22 and magnets 23a and 23b of semicircular cross section are respectively covered on the protruding portions 220, the rotor 20 has a great magnetic force working area W that acts upon the winding at the stator 24 (see FIG. 4B). Therefore, a motor using this design of rotor has a high horsepower. Further, because the magnets 23a and 23b have a semicircular cross section to provide a great magnetic force working area W to act upon the winding at the stator 24, the rotation of the rotor 20 relative to the stator 24 is stable. Because the magnets 23a and 23b are respectively covered on the protruding portions 220 that are alternatively arranged around the periphery of the magnetic body 22 in two rows and because a magnetic line of force blocking structure M is formed between the two rows of magnets 23a and 23b, magnetic lines of force are fully utilized without loss, thereby increasing the horsepower and stability of rotation of the rotor 20 relative to the stator 24.

Figure 5:
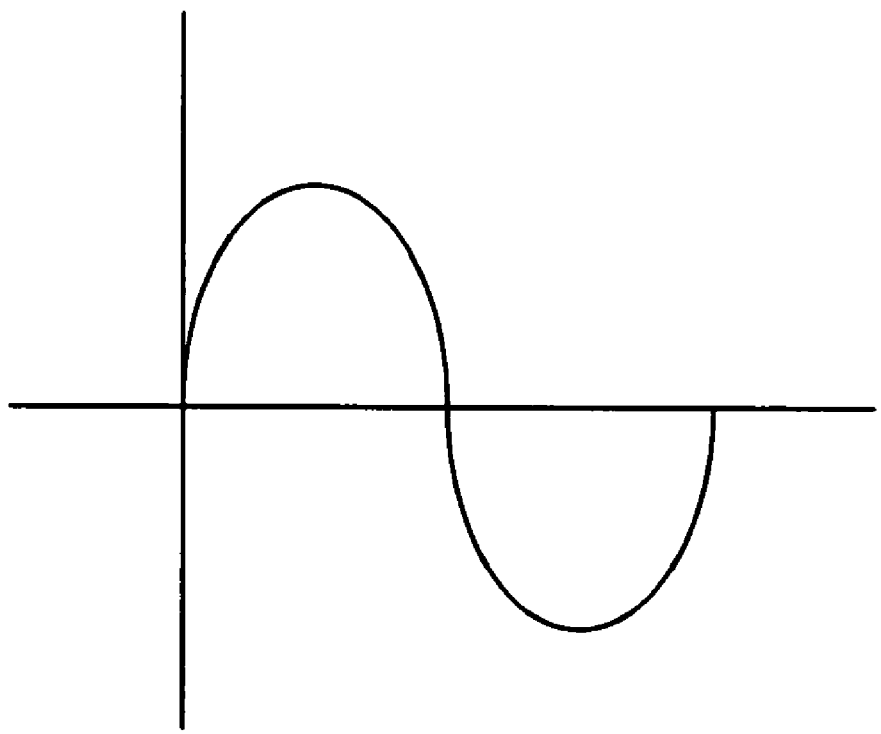
FIG. 5 is a curve of magnetic line of force obtained according to the present invention.

FIG. 5 shows a curve of magnetic line of force obtained according to the present invention. This design enables the rotor 20 to be rotated smoothly at a constant speed. Further, this design achieves concentration of the strength of the magnetic field. Therefore, a small current can start the motor rapidly.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A rotor comprising a shaft and a magnetic body surrounding said shaft, said magnetic body comprising a plurality of protruding portions, a plurality of magnetic gaps respectively defined between each two adjacent protruding portions, and a plurality of magnets respectively fixedly covered on said protruding portions, wherein said protruding portions are alternately arranged in two rows around the periphery of said magnetic body, the magnetic gaps of one row being offset with respect to the magnetic gaps of the other row so that the protruding portions of one row block one end of each of the magnetic gaps in between each two adjacent protruding portions of the other row, each of said magnets having a semicircular cross-sectional contour, the magnets at the protruding portions of one row each having one end respectively abutted against the magnets at the protruding portions of the other row to form a magnetic line of force blocking structure between the two rows of the magnets at the two rows of the protruding portions.

* * * * *